US012130797B2

United States Patent
Hashimoto et al.

(10) Patent No.: US 12,130,797 B2
(45) Date of Patent: Oct. 29, 2024

(54) COLLECTING CUSTOMIZED DATA

(71) Applicant: Woven by Toyota, Inc., Tokyo (JP)

(72) Inventors: Daisuke Hashimoto, Chofu (JP); Marc Carre, Tokyo-to (JP); Mario Freitas, Tokyo-to (JP); Takeshi Sekiya, Kawasaki (JP); Laurent Fert, Yokohama (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 268 days.

(21) Appl. No.: 17/497,988

(22) Filed: Oct. 11, 2021

(65) Prior Publication Data

US 2023/0109736 A1 Apr. 13, 2023

(51) Int. Cl.
| | |
|---|---|
| G06F 16/00 | (2019.01) |
| G06F 11/07 | (2006.01) |
| G06F 11/30 | (2006.01) |
| G06F 16/22 | (2019.01) |
| G06F 16/23 | (2019.01) |

(52) U.S. Cl.
CPC ...... *G06F 16/2358* (2019.01); *G06F 11/0775* (2013.01); *G06F 11/3079* (2013.01); *G06F 16/2246* (2019.01); *G06F 2201/86* (2013.01)

(58) Field of Classification Search
None
See application file for complete search history.

(56) References Cited

U.S. PATENT DOCUMENTS

| | | | |
|---|---|---|---|
| 9,240,079 B2 * | 1/2016 | Lambert | G07C 5/008 |
| 10,310,831 B2 | 6/2019 | Hughes et al. | |
| 11,538,287 B2 * | 12/2022 | Fang | G07C 5/0808 |
| 2014/0364970 A1 | 12/2014 | Goli et al. | |
| 2017/0168809 A1 | 6/2017 | Zander | |
| 2017/0278323 A1 * | 9/2017 | Gupta | H04W 64/00 |
| 2018/0152517 A1 * | 5/2018 | Zhong | H04L 43/04 |

(Continued)

FOREIGN PATENT DOCUMENTS

| | | | |
|---|---|---|---|
| CN | 106541860 A | * | 3/2017 |
| CN | 109859611 A | * | 6/2019 |

(Continued)

*Primary Examiner* — Jean M Corrielus
(74) *Attorney, Agent, or Firm* — HAUPTMAN HAM, LLP

(57) ABSTRACT

A vehicle includes a sensor and a transmitter. The vehicle further includes a non-transitory computer readable medium configured to store instructions thereon. The vehicle further includes a processor connected to the non-transitory computer readable medium. The processor is configured to execute the instructions for receiving or generating a data collection command, wherein the data collection command includes processing instructions for processing data collected from at least one of the sensor, an application log, or a system log, the processing information includes a number of processing operations to be performed, and a type of processing for each of the processing operations. The processor is further configured to execute the instructions for collecting sensor information based on the data collection command. The processor is further configured to execute the instructions for processing the collected data based on the processing instructions; and instructing the transmitter to transmit the processed data.

2 Claims, 8 Drawing Sheets

(56) References Cited

U.S. PATENT DOCUMENTS

| | | | |
|---|---|---|---|
| 2019/0009790 A1* | 1/2019 | Michalakis | G06F 11/3013 |
| 2020/0073385 A1 | 3/2020 | Jobanputra et al. | |
| 2020/0077292 A1* | 3/2020 | Tsuyunashi | H04W 4/44 |
| 2020/0092261 A1* | 3/2020 | Makke | H04L 63/0421 |
| 2020/0118020 A1* | 4/2020 | Soda | G08G 1/0112 |
| 2020/0175193 A1* | 6/2020 | Pese et al. | G06F 21/6245 |
| 2021/0124340 A1* | 4/2021 | Isaac | G01P 15/0891 |
| 2021/0192867 A1* | 6/2021 | Fang | G07C 5/0816 |
| 2021/0226974 A1 | 7/2021 | Hirano et al. | |

FOREIGN PATENT DOCUMENTS

| | | | | |
|---|---|---|---|---|
| CN | 111259299 A | * | 6/2020 | |
| CN | 111797346 A | * | 10/2020 | G01D 21/02 |
| CN | 111949484 A | * | 11/2020 | G06F 11/3017 |
| JP | 2012-221031 A | | 11/2012 | |
| JP | 2020038405 A | * | 3/2020 | G07C 5/008 |
| JP | 2020038407 A | * | 3/2020 | B60W 20/50 |
| JP | 2020038408 A | * | 3/2020 | B60W 20/50 |
| JP | 2020038409 A | * | 3/2020 | G07C 5/008 |
| JP | 2020038595 A | * | 3/2020 | G07C 5/008 |
| JP | 2020107181 A | * | 7/2020 | |
| WO | 2020/110415 A1 | | 6/2020 | |
| WO | WO-2020194485 A1 | * | 10/2020 | G07C 5/085 |

\* cited by examiner

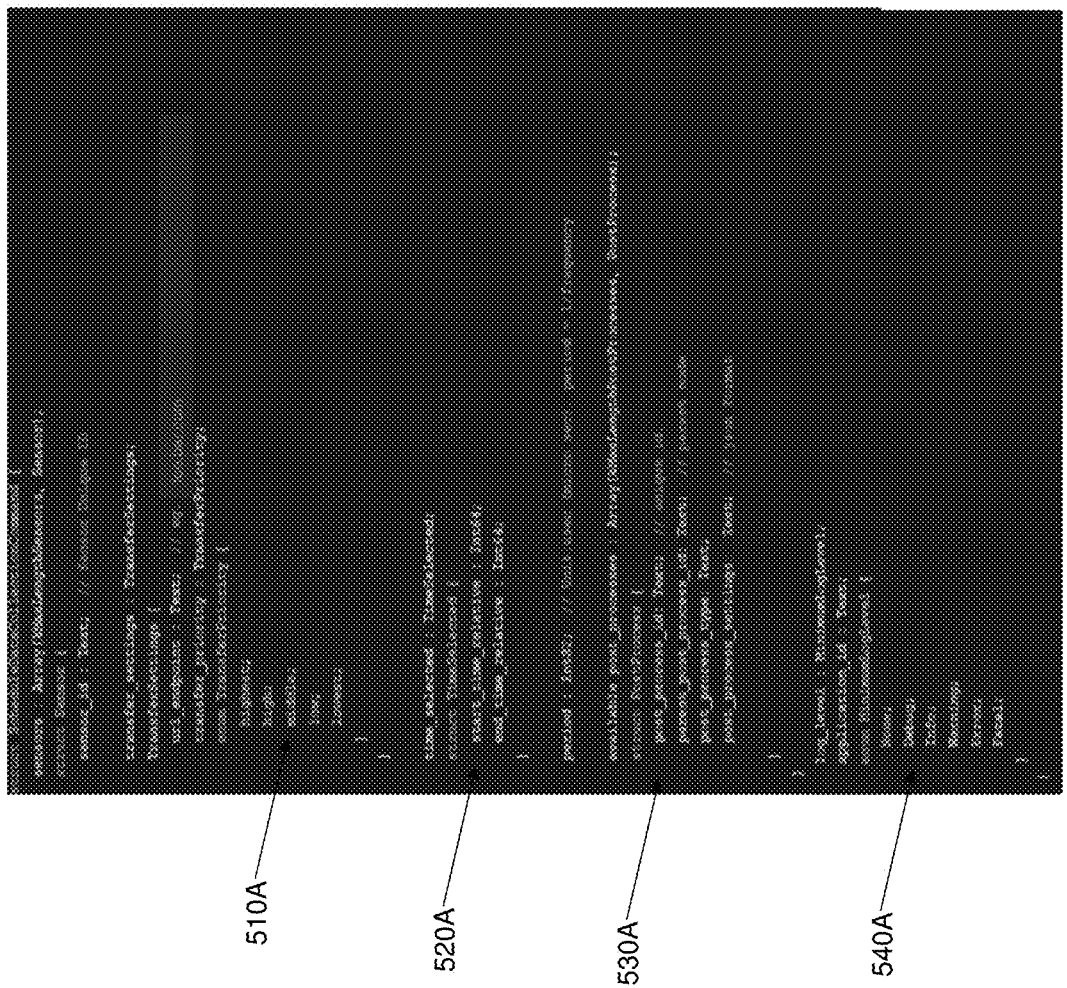

COLLECTING CUSTOMIZED DATA

BACKGROUND

Devices, such as vehicles, robots or appliances, are more frequently including operating systems (OS) that are accessible by third party application (app) developers. The third party app developers develop programs that are run on the OS for the devices in order to alter a user's experience with the device. In order to maximize user satisfaction, the third party app developers collect data on the performance of the app and update or debug the app.

In some instances, the third party app developer accesses the device in order to collect data on the performance of the app. In some instances, the third party app developer receives information related to performance of the app from user, such as through reviews of the app. In some instances, the third party app developer processes raw data received from the device in order to debug or update the app running on the device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A is a view of code for a data collection command in accordance with some embodiments.

DETAILED DESCRIPTION

Figure 1:
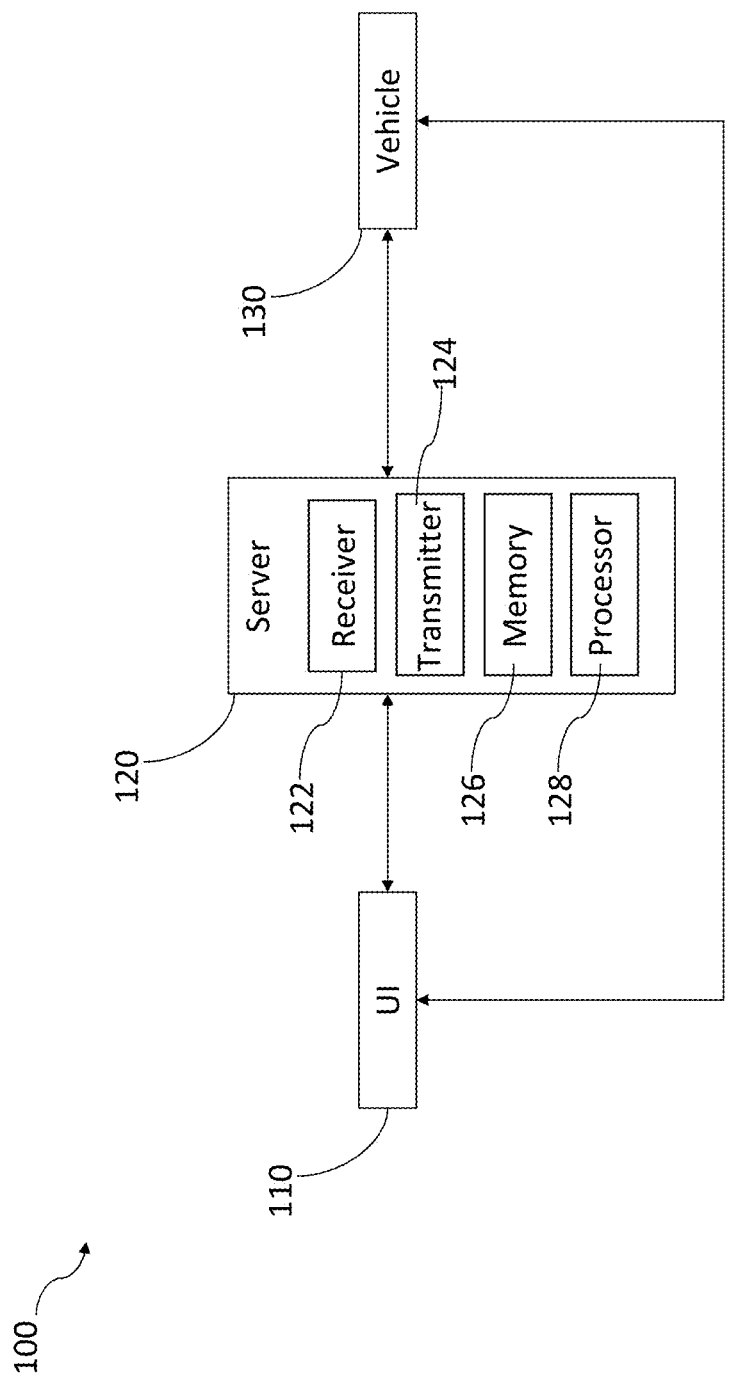
FIG. 1 is a diagram of a system for collecting customized data in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For the sake of brevity, communication between various components of this disclosure will be described as wireless. One of ordinary skill in the art would understand that communication using a wired connection is also within the scope of this disclosure and that this disclosure is not limited to only wireless communication.

An operation system (OS) is intended to permit application (app) designers to develop and implement apps operable on vehicles. The OS protects the operation of safety protocols in the vehicle but seeks to maximize access to non-safety protocols to the app designers. During the design and implementation of apps, the designers will seek to obtain feedback information related to app failures, problems, performance improvements, test data collection, or other desired information in order to debug or improve the app. This disclosure is directed at how the collected data and feedback information is customized by the app designer in order to provide the information content, format and timeliness sought by the app designer.

An application, such as applications 216, 226 or 232 (FIG. 2), which is developed by the app designer is able to transmit a data collection command, such as data collection command 400 (FIG. 4), to a data collection unit, such as data collection unit 236 (FIG. 2), via the OS, such as OS 218, 228 or 238 (FIG. 2), in response to the application determining that a condition of a trigger event is met. The app designer is able to define the trigger event for collecting data from vehicle sensors and a time range, such as time range 402 (FIG. 4), over which the data is collected. The trigger event is the occurrence within the vehicle or in the environment surrounding the vehicle about which the app designer is seeking data. For example, a trigger event includes sudden acceleration, sudden braking, capturing an image of a target of a data request, detecting of a target of a data request, other suitable occurrences. In some embodiments, the trigger event is an occurrence of an event within the application, such as failure or "crashing" of the app. In some embodiments, the application determines whether the condition of the trigger event (trigger condition) is met or not, and, in response to the application determining that the trigger condition is met, the application sends the data collection command to the data collection unit. In some embodiments, the data collection unit determines whether the trigger condition is met or not, and, in response to determining that the trigger condition is met, the data collection unit gathers data associated with the trigger event. In some embodiments, the server, such as server 120 (FIG. 1), determines whether the trigger condition is met or not, and, when the server determines that the trigger condition is met, the server sends the data collection command to the data collection unit.

Figure 4:
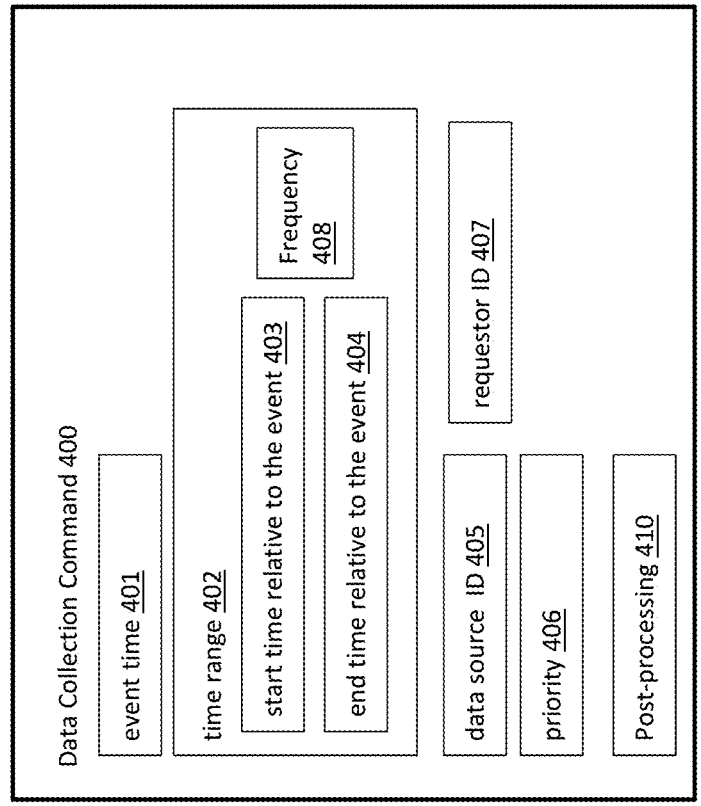
FIG. 4 is a diagram of a data structure of a data collection command in accordance with some embodiments.

The data collection command includes the information of a time range. The time range over which the data is collected refers to a time period before and/or after the trigger event, such as start time relative to the event 403 and end time relative to the event 4 (FIG. 4). For example, 5 seconds (s) before to 10 s after the trigger event (start time relative to the event=−5 seconds, end time relative to the event=10 seconds). In some embodiments, the time range also includes frequency parameter that indicates how often the data should be sampled from the time range. For example, when the event time is t=100 seconds, start time is −1 seconds, the end time is 2 seconds and the frequency is 10 Hz (100 msec cycle), then the data at t=99.0 sec, 99.1 sec, 99.2 sec, . . . , 101.9 sec, 102.0 sec is collected by the data collection command. The data collection command includes data source ID, such as sensor ID and/or application ID, so that the app designer is also able to customize the type of data to be collected in response to the trigger event. For example, camera image data, LiDAR data, RADAR data, vehicle position and orientation data, acceleration data, an application log, proximity data related to a distance between the vehicle and objects surrounding the vehicle, or traffic and travel information, such as Vehicle Information and Communication System (VICS) and Traffic Message Channel (TMC). Once the trigger condition is satisfied, the data collection command is sent to the data collection unit for processing and the collected data is processed and transmitted out of the vehicle based on the information in the data collection command.

Figure 2:
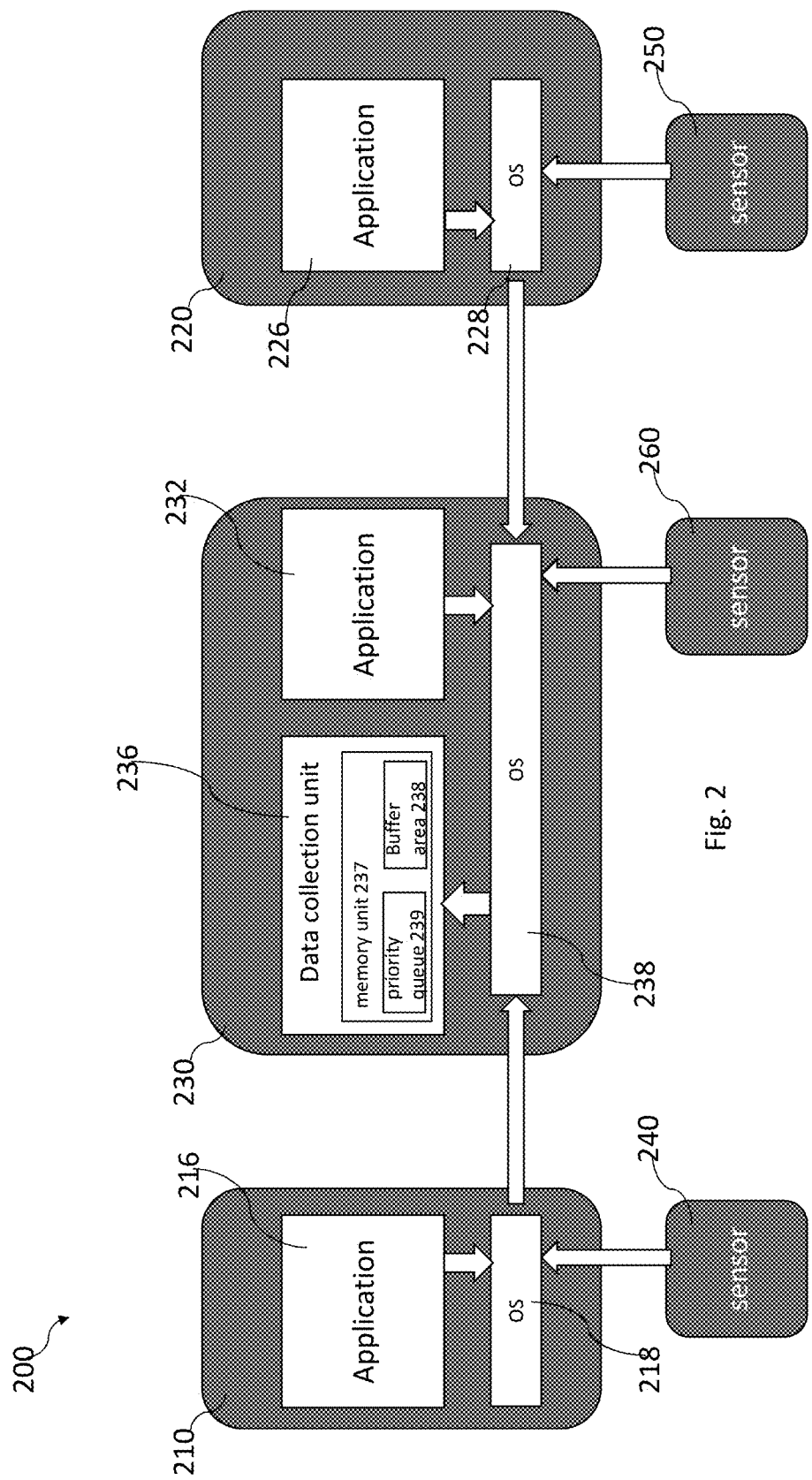
FIG. 2 is a diagram of a system for collecting customized data in accordance with some embodiments.

Upon receiving the data, the data collection unit adds the request to a priority queue, such as priority queue 239 (FIG. 2), in a memory unit, such as memory unit 237 (FIG. 2). In some embodiments, the data collection unit is able to adjust the priority of requests within a queue. In some embodiments, data related to vehicle safety or manufacturer apps is able to be given a higher priority than third party apps. In some embodiments, the priority of the requests is specified by the priority information, such as priority 406 (FIG. 4), in the data collection command. In some embodiments, the priority of the request is determined by an identity of a requestor, such as requestor ID 407 (FIG. 4), which sends the data collection command. In some embodiments, the priority of the request is determined by an identity of a source, such as source ID 405 (FIG. 4), from which the data is collected. The data collection unit processes the data based on customized instructions, such as post-processing 410 (FIG. 4), from the app designer. The processed data is then transferred out of the vehicle to a server or cloud based system for access by the app designer.

In some embodiments, the processing of the data is performed prior to the transmission of the data outside of the vehicle. This processing helps to minimize the amount of data transmitted and to provide data that is most relevant to the app designer and in a format preferred by the app designer.

The app designer is able to select how many processing operations should be performed on the collected data, the types of processing performed on the collected data as well as the algorithms used to implement the requested processing. By increasing the flexibility to app designer to set processing operations performed on the collected data, the app designer is able to receive appropriate data that is more targeted to the debugging of the app, performance improvement of the app, testing of the app, training of neural networks of the app for optimization, or other modifications or updates to the app without losing targeted information from the data and without having unnecessary data. In some cases, the amount of data that is transferred out of the vehicle is reduced by the appropriate processing operations which are selected by the app designer. The reduced amount of data helps the system to reduce the amount of network traffic between the vehicle 130 and the server 120. The reduced amounts of data also helps the system to provide data to a higher number of apps in order to provide a more customizable experience for the vehicle operator, such as the vehicle driver. In some instances, the amount of data provided to the user is increased as a result of the processing selected by the user. The increased amount of data, in some instances, provides the user with a larger amount of useful data in order to allow the user to more efficiently review functionality of the app, train and optimize the neural network of the app with more amount of useful training data, test the app with more amount of test data in order to have better test coverage, and provide updates or debugging of the app.

Figure 7:
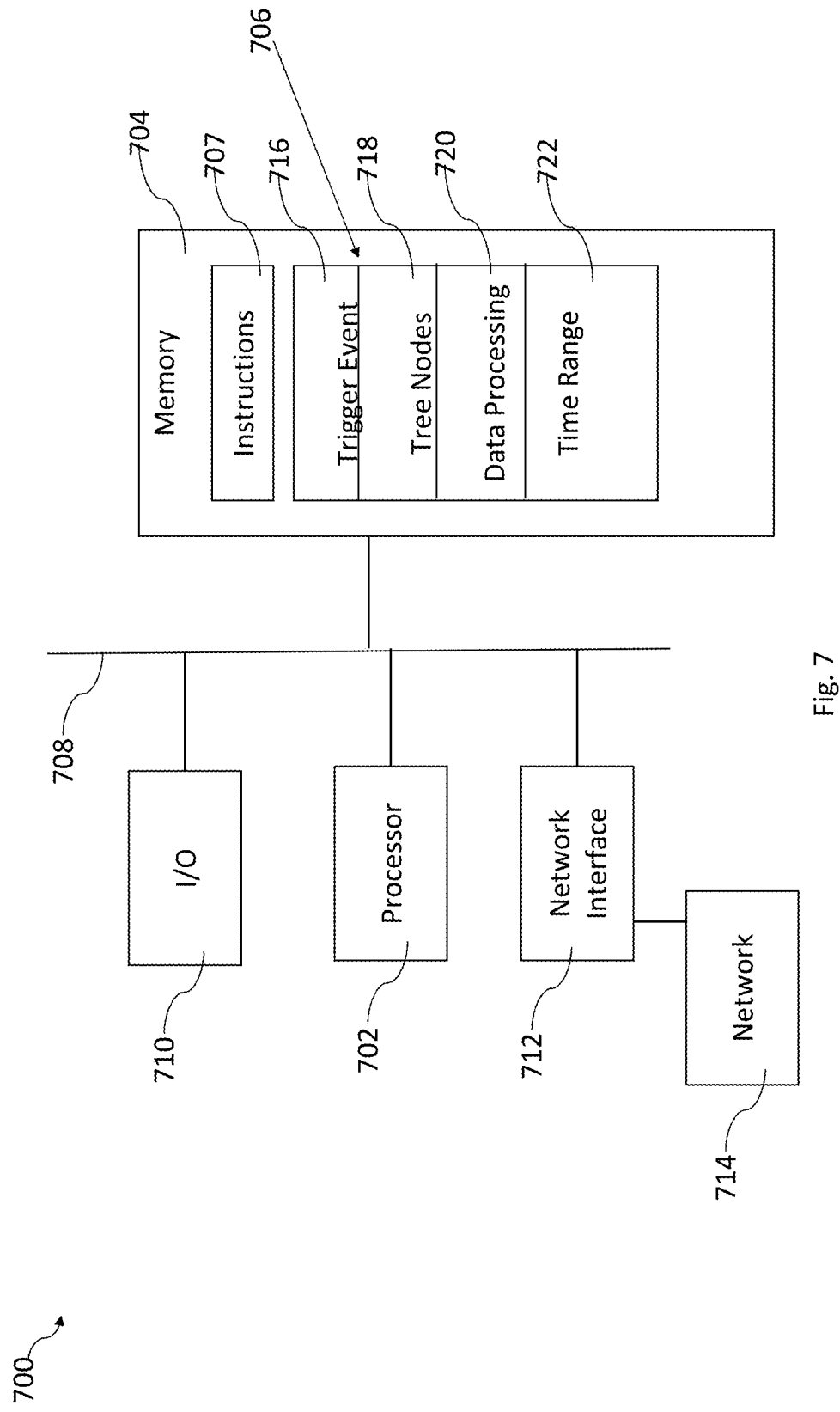
FIG. 7 is a diagram of a system for implementing collecting of customized data in accordance with some embodiments.

In order to determine the processing operations performed on the collected data, the app designer uses a tree structure and unique node IDs to determine which operations are performed on which portions of the processed data. In some embodiments, the app designer uses a graph structure for determining operations to be performed on the collected data. The tree structure also determines an order that the processing operations are performed on the collected data. For example, in some embodiments, a cropping operation is performed on an image and then the cropped image is re-sized. In some embodiments, an image is resized and then a cropping operation is performed on the resized image. In some embodiments, the app designer is able to determine that the target data of the processing should be image data, then that the image data should be cropped and that the cropped data is to be resized. In some embodiments, the app designer is able to determine whether the image data with or without Gamma correction is used for the data processing. In some embodiments, the app designer is able to determine the format, such as RGB, YUV444, YUV420, Bayer pattern image, etc., of the image data to be used for the processing. This allows the app designer to use appropriate data for testing the app and training the neural network of the app without losing useful information from the data. The app designer is also able to perform a second operation such as compressing on the cropped data. That is, multiple operations are able to be performed on a single piece of data, so long as each operation refers to a unique "parent" node in the tree structure. These processing guidelines enable the app designer to reduce the amount of workload of the system, such as processor 702, memory 704, IO traffic of bus 708 (FIG. 7). The app designer is also able to determine the algorithm used for certain operations, such as JPEG compression, PNG compression, ZIP compression, H.264 encoding to compress the size of the data so that the app designer is able to flexibly choose a desired algorithm for a usecase of the app even if the usecase and the target of the collected data change over time. By knowing algorithms, such as compression algorithms, encoding algorithms and interpolation algorithm, e.g. linear interpolation, bilinear interpolation, bicubic interpolation, etc., used to process the collected data, the app designer is able to efficiently manipulate the processed data in order to determine what, if any, modifications to make to the app. There are also another cases that the application software, such as applications 216, 232, or 226 (FIG. 2), is reused to the next generation product, a processor, such as the processor 702 (FIG. 7), of the next generation product is different from the current generation, and the HW accelerator of the processor of the next generation supports a new processing algorithm with better performance or the HW accelerator does not support the processing algorithm that is supported by the processor of the current generation. Even in these cases, the flexibility of the algorithm using the post-processing enable the app designer to easily change the algorithms to be used in the next generation with minimum amount of change of the application software. In some embodiments, the app designer is able to customize the output format for the transmitted data as well. For example, when the data is image data, the output format of the data includes information about pixel height, pixel width, number of channels, order of channels (such as RGB and BGR), layout of data (such as channel-height-width (CHW) and height-width-channel (HWC)), file format (such as jpeg file, png file), format of serialized data (such as Google Protocol Buffers, Robot Operating System (ROS) topic), etc., This allows the app designer to flexibly choose the an algorithm and a data format that fit a usecase for the app even if the usecase and the target of the collected data change over time.

By providing an ability to customize data received by the app developer, the current disclosure allows outside application developers to access data from sensors in a vehicle in order to debug, test, optimize or update the app. The format, timing and content of the data collected is able to be customized by the developer to closely relate to a development environment of the app, such as development tools, and the performance of the app and identify occurrences which negatively impact the performance of the app in order to efficiently debug the app. While the below description refers to use in a vehicle, such as an automobile, one of ordinary skill in the art would understand that this disclosure is applicable to other types of movable devices, such as robots, drones, household appliances or other suitable devices.

FIG. 1 is a diagram of a system 100 for collecting customized data in accordance with some embodiments. The system 100 includes a user interface (UI) 110 configured to receive information from a user. The UI 110 is configured to transfer the information to a server 120 or a vehicle 130. In some embodiments, the UI 110 is capable of directly communicating with the vehicle 130. In some embodiments, the UI 110 is configured to communicate with the vehicle 130 through the server 120. The system 100 further includes the server 120 configured to communicate with the UI 110 and the vehicle 130. The system 100 further includes the vehicle 130 capable of communicating with the server 120 and the UI 110.

The UI 110 is configured to receive input instructions from the user. In some embodiments, the user includes a software developer. In some embodiments, the user includes an insurance provider. In some embodiments, the user includes law enforcement.

In some embodiments, the UI 110 permits the user to upload binary executable files or source code of an app to be run on an electronic control unit (ECU) of the vehicle 130. The UI 110 also permits the user to update an app run on the ECU of the vehicle 130. For example, in some embodiments, the user is able to use the UI 110 to send an over-the-air (OTA) update to the app. In some embodiments, the update to the app is based on received data from the vehicle 130 resulting from a data collection command generated by the app. In some embodiments, the condition of the trigger event is updated by updating the app. In some embodiments, the contents of the post-processing instructions, such as information in post-processing parameter 410 (FIG. 4), that is transferred from the app to a data collection unit, such as data collection unit 236 (FIG. 2), is updated by updating the app. In some embodiments, any other information in a data collection command, such as data collection command 400 (FIG. 4), that is transferred from the app to the data collection unit is updated by updating the app. In some embodiments, the UI 110 permits the user to upload weight data of the trained neural network of the app to be run on the ECU of the vehicle 130.

In some embodiments, the UI 110 includes a graphical user interface (GUI). In some embodiments, the UI 110 is includes a mobile terminal, such as a mobile telephone, connectable to the server 120. In some embodiments, the UI 110 includes a computer connectable to the server 120. The UI 110 is also able to provide the user with updates regarding a status of a data request or of an app being run on the vehicle 130. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 is configured to receive information from the user indicating a type of processing to be performed on the data collected by the vehicle 130. For example, if a usecase of the app changes or functionality of the ECU in the vehicle 130 changes, the user is able to update the app to modify what data collection commands the app generates.

In some embodiments, the UI 110 is configured to receive from the user a data collection request with information corresponding to event time, time range, data source ID, post-processing, or other parameters. In some embodiments, the UI 110 is configured to receive a data collection request including information similar to data collection command 400 (FIG. 4). The UI 110 converts the data collection request to the data collection command. In some embodiments, the UI 110, instead of the app, sends the data collection command to a data collection unit, such as data collection unit 236 (FIG. 2), in the vehicle via a network, such as a wirelessly network.

The server 120 includes a receiver 122 configured to receive information from the UI 110 and the vehicle 130. The server 120 includes a transmitter 124 configured to transmit information to the UI 110 and the vehicle 130. The server 120 includes a memory 126 configured to store data requests, binary executable files or source code of the app and weight data of the neural network of the app from the UI 110; and to store collected data from the vehicle 130. The server 120 further includes a processor 128 configured to process information during the communication with the UI 110 and the vehicle 130. In some embodiments, the collected data received from the vehicle 130 is already processed in accordance with a data request from the user or an app running on the vehicle 130. In some embodiments, the collected data received from the vehicle 130 is processed by the processor 128 in accordance with the data request.

The memory unit 126 is configured to store information received by the receiver 122. In some embodiments, the memory 126 includes random access memory (RAM), such as DRAM, flash memory, or another type of memory. In some embodiments, the memory 126 is accessible by the user. In some embodiments, updates to information in the memory 126 trigger notifications to the user associated with the information updated in the memory 126. For example, in some embodiments, a notification is sent to the user in response to the server 120 receiving data related to a data collection command from an app developed by the user. In some embodiments, the memory 126 stores information in conjunction with time stamp data indicating a time at which the information was received. In some embodiments, the transmitter 124 is configured to transmit information to the UI 110 or the vehicle 130 based on priority level.

The transmitter 124 is configured to transmit information to the UI 110 and the vehicle 130. In some embodiments, the transmitter 124 is configured to provide an update to the user in response to an update in the memory 126. In some embodiments, the transmitter 124 is configured to provide an application log of an app to the user in response to a received request from the user.

The transmitter 124 is configured to transmit requests to the vehicle 130. In some embodiments, the transmitter 124 is configured to transmit the requests to the vehicle 130 based on a priority level of the request.

In some embodiments, the transmitter 124 is configured to transmit requests to the vehicle 130 any time the server 120 has sufficient connectivity to the vehicle 140. In some embodiments, the transmitter 124 is configured to transmit the requests to the vehicle 130 periodically so long as the vehicle 130 is able to receive new requests and the transmitter 124 has sufficient connectivity to the vehicle 130. In some embodiments, the transmitter 124 is configured to transmit the requests to the vehicle 130 in batches, such as in groups of 5 requests, 20 requests or some other number of requests. In some embodiments, the transmitter 124 is configured to request confirmation of receipt of the request from the vehicle 130. In response to failing to receive confirmation of receipt from the vehicle for a predetermined time period, the transmitter 124 is configured to re-transmit the request.

The vehicle 130 includes sensors to detect both an internal status of the vehicle 130 as well as an external environment surrounding the vehicle 130. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, a Global Positioning System (GPS), an inertial measurement unit (IMU), or another suitable sensor. The vehicle 130 includes an ECU configured to run an app stored on the vehicle 130. In some embodiments, the vehicle 130 is configured to determine trigger events for collecting and outputting data based on instructions stored with the app. In some embodiments, the vehicle 130 is configured to determine durations and types of data to collect and output based on instructions stored with the app.

The app is capable of initiation a data collection command in response to a detected occurrence of a trigger event. In some embodiments, the data collection command is generated in response to a trigger event, such as "crashing" of the app, a detected abnormality in the app, or another suitable detected occurrence. In some embodiments, when the app detects a sudden braking or acceleration, the app determines that the condition of the trigger event is met. In some embodiments, the app is an object recognition application, and, when the app detects a specific objects such as a fallen object on the road, an emergency vehicle, a vehicle involved in an accident, an animal on the road, any kind of unusual object on the road, or another suitable object, the app determines that the condition of the trigger event is met. In some embodiments, when the app detects a malfunction from diagnostic information of the vehicle 130, the app determines that the condition of the trigger event is met. In some embodiments, the vehicle 130 is configured to generate a notification to the user in response to detecting a trigger event associated with the app. In some embodiments, the notification is transmitted directly to the user, e.g., through the UI 110. In some embodiments, the notification is transmitted to the user through the server 120. In some embodiments, the notification includes an audio or visual notification. In some embodiments, the notification is configured to cause the UI 110 to automatically display the notification without user interaction.

In response to receiving the data collection command generated by an app or data collection request from the UI 110 or server 120, the vehicle 130 is configured to assign a data request ID to the received request or the request is processed to be agnostic to an originating system or program of the data request. Making the request agnostic to the originating system or program of the data request helps with expanding an ability of the vehicle 130 to receive and process a wide range of requests from different users and systems. The ECU of the vehicle 130 includes a processor for processing the data requests and determining what type of information from which sensors available in the vehicle 130 are capable of satisfying the data request. The vehicle 130 further includes a memory for storing data from the sensors. In some embodiments, the processor accesses the memory to determine whether any stored data is capable of satisfying the data request. The vehicle 130 is further capable of transmitting the data deemed to satisfy the data request to the server 120 or UI 110. In some embodiments, the processor is configured to attempt to satisfy received requests in a priority order based on a received priority level of the data request. In some embodiments, the vehicle 130 is configured to transmit data to the server 120 or UI 110 preferentially based on the received priority level of the request.

FIG. 2 is a diagram of a system 200 for collecting customized data in accordance with some embodiments. In some embodiments, the system 200 is completely within a vehicle, such as an automobile. In some embodiments, the vehicle including system 200 is the vehicle 130 (FIG. 1). The system 200 includes at least one ECU. As an example of FIG. 2, the system 200 includes a first ECU 210, a second ECU 220 and a third ECU 230. The system 200 further includes at least one sensor 240 in communication with the first ECU 210 and is configured to capture data related to functionality of the first ECU 210. For example, in some embodiments, the sensor 240 includes a front camera and the first ECU 210 is configured to help implement image recognition applications using the image data from the front camera and autonomous driving applications. The system further includes at least one sensor 250 in communication with the second ECU 220 and is configured to capture data related to functionality of the second ECU 220. For example, in some embodiments, the sensor 250 is configured to capture interactions between the user an infotainment system of the vehicle and the second ECU 220 is configured to control the infotainment system of the vehicle. The system 200 further includes at least one sensor 260 in communication with the third ECU 230 and is configured to capture data related to functionality of the third ECU 230. For example, in some embodiments, the sensor 260 includes an accelerometer and the third ECU 230 is configured to control motor or engine operations of the vehicle.

In some embodiments, the first ECU 210, the second ECU 220 and the third ECU 230 are integrated into a single ECU. In some embodiments, one of the first ECU 210, the second ECU 220 or the third ECU 230 is separated and the other two ECUs are integrated together. In some embodiments, each of the first ECU 210, the second ECU 220 and the third ECU 230 are separate. All of the ECUs are able to communicate with each other using an OS 218, 228 and 238. In some embodiments, the system 200 includes more than three ECUs. In some embodiments, the system 200 includes less than three ECUs. In some embodiments, the same type of OS, such as QNX™, is used for the OS 218, 228 and 238. In some embodiments, different types of OS are used for the OS 218, 228 and 238. For example, the OS 218 is QNX™, the OS 228 is Automotive Grade Linux (AGL™), and the OS 238 is eMCOS™. In some embodiments, the first ECU 210, the second ECU 220 and the third ECU 230 are connected to each other via interfaces such as Ethernet, a controller area network (CAN) bus, etc.

The first ECU 210 includes an application 216. In some embodiments, the application 216 is generated and/or installed in the first ECU 210 by a vehicle manufacturer. In some embodiments, the application 216 is generated or installed in the first ECU 210 by a third party. In some embodiments, the application 216 is installed or updated by UI 110 via OTA update. The application 216 is capable of exchanging data with other components of the vehicle, such as sensor 240, the second ECU 220 and the third ECU 230, using OS 218. In some embodiments, an application programming interface (API) is used to facilitate communication between the OS 218 and the application 216.

The application 216 includes information related to one or more trigger events in order to generate a data collection command. The application 216 further includes information for the type of data to be collected in response to detection of the trigger event by the application 216 or by a data collection unit 236. The application 216 further includes information for how the collected data is processed following collection prior to transmission of the data outside of the vehicle. In some embodiments, the application 216 further includes priority information related to a priority level of a data collection command generated in response to detection of a trigger event. In some embodiments, in response to detection of an occurrence of a trigger event, the application 216 is configured to generate a data collection command similar to data collection command 400 (FIG. 4). In some embodiments, the information related to the trigger events, the information for the type of data to be collected, the information for how collected data is processed and the priority information are able to be updated by UI 110 via OTA update.

In some embodiments, the trigger event is an occurrence within the application 216, such as failure or crashing of the application 216. In some embodiments, the trigger event is an occurrence outside of the application 216, such as detection of sudden braking or acceleration. In some embodiments, the trigger event includes detection of an object from data captured by the sensor 240. One of ordinary skill would understand that the examples of trigger events above is merely exemplary and different types of trigger events are within the scope of this disclosure.

In some embodiments, the application 216 is configured to transfer an application log along with the data collection command to the data collection unit 236. The application log includes information related to operation of the application 216. In some embodiments, the application log further includes information from the sensor 240.

The application 216 is configured to transfer to the data collection command to the data collection unit 236 using OS 218, which is capable of communicating with the OS 238. The OS 218 is an operating system of the vehicle. In some embodiments, the OS 218 communicates with the OS 238 via a wired connection such as Ethernet, CAN bus, etc. In some embodiments, the OS 218 communicates with the OS 238 wirelessly.

The second ECU 220 is similar to the first ECU 210 and similar elements have a same reference number increased by "10." In some embodiments, the second ECU 220 is configured to implement apps 226, having a different functionality from apps 216 implemented on the first ECU 210.

The third ECU 230 is configured to receive information from the first ECU 210 and the second ECU 220 using the OS 238. That is, the OS 218 from the first ECU 210 and the OS 228 from the second ECU 220 interface with the OS 238 of the third ECU 230. In some embodiments, the information is transferred to the third ECU 230 wirelessly. In some embodiments, the information is transferred to the third ECU 230 via a wired connection such as Ethernet, CAN bus, etc.

The third ECU 230 includes an application 232. The application 232 is capable of generating data collection commands and application logs in a similar manner as that described above with respect to the application 216.

The third ECU 230 includes a data collection unit (DCU) 236. The DCU 236 is configured to collect data from the sensor 240, the sensor 250 and/or the sensor 260, collectively referred to as sensors based on data requests generated by the application 216, the application 226 and/or the application 232, collectively referred to as apps. Each of the apps is not limited to collecting data from the sensor associated with a same ECU as the app. Each of the apps is able to collect data from any sensor, which the app is authorized to access. In some embodiments, certain sensors have limited access due to privacy, safety or other concerns.

Further, the DCU 236 is capable of access application logs, such as from applications 216, 226 or 232, in order to collect data based on a received data collection command. In some embodiments, the DCU 236 collects information from an application log related to an application different from the application that generated a data collection command. For example, in some embodiments, the DCU 236 receives a data collection command from the application 216; and the data collection command instructs the DCU 236 to collect data from an application log of the application 226. In some embodiments, the DCU 236 is configured to override an instruction in the data collection command to retrieve information from an application log in response to a determination that the application that generated the data collection command is not permitted to access the application log. In some embodiments, the DCU 236 is configured to permit collection of data from only select levels of the application log, such as an error level, but override a request for data from other levels of the application log based on permissions granted to the application that generated the data collection command.

The sensors include at least one of a camera, a LiDAR sensor, a RADAR sensor, a SONAR sensor, an accelerometer, a Global Positioning System (GPS), an inertial measurement unit (IMU), or another suitable sensor. One of ordinary skill in the art would understand that the sensors includes multiple sensors, including multiple different types of sensors, in some embodiments. The sensors are configured collect data during operation of the vehicle. The data from the sensors is transferred to the DCU 236 through the OS 218, the OS 228 and/or the OS 238, collectively referred to as the OS. In some embodiments, the data from the sensors is able to be transferred to the DCU 236 without going through the OS 218 in order to suppress the performance overhead of the OS 218. The data from the sensors includes metadata related to a time, vehicle location, vehicle orientation, vehicle status, sensor status, sensor parameters, sensor calibration data or other suitable metadata when the data is collected by the sensors.

The DCU 236 is configured to receive the data collection commands from the apps. The data collection command includes information related to what type of data should be collected and a time range for collecting the data. The data collection command also includes instructions for processing the collected data prior to transmission of the data to the user, such as the app designer or another user. In some embodiments, the data collection command includes priority information indicating a priority level for fulfilling the data collection command. In some embodiments, the DCU 236 is capable of overriding the priority level in the data collection command based on other data collection commands pending within the DCU 236. In some embodiments, the data collection command includes information related to an origin of the data collection command and which of the sensors the DCU 236 should capture the data from. In some embodiments, the data collection command includes information similar to the data collection command 400 (FIG. 4). In some embodiments, in response to the data collection command failing to indicate a type of processing to be performed on the collected data, the DCU 236 is configured to implement default processing. In some embodiments, the default processing includes data resizing, data cropping, data compression or other suitable default processing.

The DCU 236 includes a memory unit 237. In some embodiments, the memory unit 237 includes a random access memory (RAM), such as dynamic RAM (DRAM), flash memory, or another suitable memory. The memory unit 237 is configured to store information during implementation of fulfilling data collection commands. Information for fulfilling data collection commands includes information from the sensors, intermediate processed data based on instructions in the data collection command, metadata, instructions for the DCU 236 to interface with external components such as the sensors, and/or other information generated during fulfillment of the data collection command.

The DCU 236 further includes a buffer area 238 within the memory unit 237. The buffer area 238 is configured to receive data from the sensors and application logs from the applications 216, 232 and 226. In some embodiments, data from the sensors and application logs are automatically transferred to the buffer area 238 during operation of the vehicle. In some embodiments, the data from the sensors includes metadata, such as time and location of the vehicle when the data was detected. The buffer area 238 is configured to store the data from the sensors and the application logs. In response to receiving a data collection command, the DCU 236 is able to review the data from the sensors and the application logs stored in the buffer area 238 in order to retrieve data usable for fulfilling the data collection command.

Due to limited capacity of the buffer area 238, in some instances the data sought by the DCU 236 was previously at least partially overwritten in the buffer area 238 due to the data having been collected a long time prior to the attempted retrieval of the data. In some embodiments, the buffer area 238 has a data structure of a ring buffer, so that old data is overwritten automatically with the new data. In some embodiments, the buffer area 238 has a data structure of database, such as Key Value Store (KVS), Relational Database, etc., and old data is cleaned from the dababase by the data collection unit 236 periodically. In some embodiments, in response to a determination that less than all of the data for fulfilling the data collection command is present in the buffer area 238, the DCU 236 is configured to access one or more of the sensors in order to collect the requested data. In some embodiments, the DCU 236 is configured to ignore the data collection command in response to a failure to identify all the data for fulfilling the data collection command in the buffer area 238. In some embodiments, the DCU 236 is configured to proceed with collection and processing of the data that is available in the buffer area 238 even though less than all of the data for fulfilling the data collection command is available. In some embodiments, the DCU 236 is configured to hold the data collection command until all data for fulfilling the data collection command is present in the buffer area 238. In some embodiments, the DCU 236 is configured to prevent overwriting of data in the buffer area 238 that is related to a pending data collection command.

The DCU 236 further includes a priority queue 239 configured to store data collection commands in order of priority. In some embodiments, the priority level of a data collection command is determined based on information within the data collection command. In some embodiments, the DCU 236 sets the priority of a data collection command based on an origin of the data collection command, i.e., which user or application generated the data collection command, a time at which the data collection command was received, a type of data requested by the data collection command, or other suitable criteria for setting the priority level for the data collection command. In some embodiments, the DCU 236 overrides a priority level in the data collection command in response to the DCU 236 determining that the priority level in the data collection command is different from a priority level determined by the DCU 236. The data collection commands stored in the priority queue 239 are processed in order of priority. The DCU 236 is further configured to instruct a transmitter (not shown) to transmit the processed data corresponding to a data collection command in order of priority, in some embodiments. In some embodiments, in response to the DCU 236 determining that data for fulfilling a data collection command is not present in the buffer area 238, a priority level of the data collection command in the priority queue 239 is reduced for later processing.

In some embodiments, the DCU 236 is further configured to access the applications in order to retrieve application log data for fulfilling a data collection command. In some embodiments, the applications transfer application log data for fulfilling a data collection command to the DCU 236 along with the data collection command. In some embodiments, the DCU 236 is configured to determine whether one of the applications is permitted to access another of the applications in order to fulfill a data collection command. In response to a determination that the first application is not permitted to access the second application, the DCU 236 is configured to ignore the data collection command, in some embodiments. In some embodiments, the DCU 236 processes the data collection command without application log data from the second application in response to a determination that the second application is not accessible by the first application.

In some embodiments, the DCU 236 is further configured to access the OS 218, 228 and 238 in order to retrieve system log data for fulfilling a data collection command. When the application sends a data collection command, such as data collection command 400 (FIG. 4), having a the data source ID, such as data source ID 405 (FIG. 4), that is pointing to the system log, the DCU 236 accesses the system log from the OS, process the system log based on post-processing instructions, such as post-processing parameter 410 (FIG. 4), and transfers the system log as collected data to the server 130. In some embodiments, the system log is Linux OS's syslog which is generated by OS 218, 228 and 238. In some embodiments, the system log is Diagnostic Log and Trace (DLT) log which is generated by OS 218, 228 and 238.

The DCU 236 is further configured to process the collected data based on instruction data in the data collection command. The instruction data indicates a predetermined operations to be performed on the collected data. The DCU 236 is configured to process the collected data in accordance with the data collection command prior to instructing a transmitter to transmit the results of the data collection command to the user. In some embodiments, the processing operations include operations such as image crop; image resize; video encoding, such as H.264; image encoding, such as png or JPEG; compression zip; data serialization, e.g., using Google Protocol Buffer, ROS topic, etc.; or other suitable operations.

Figure 6:
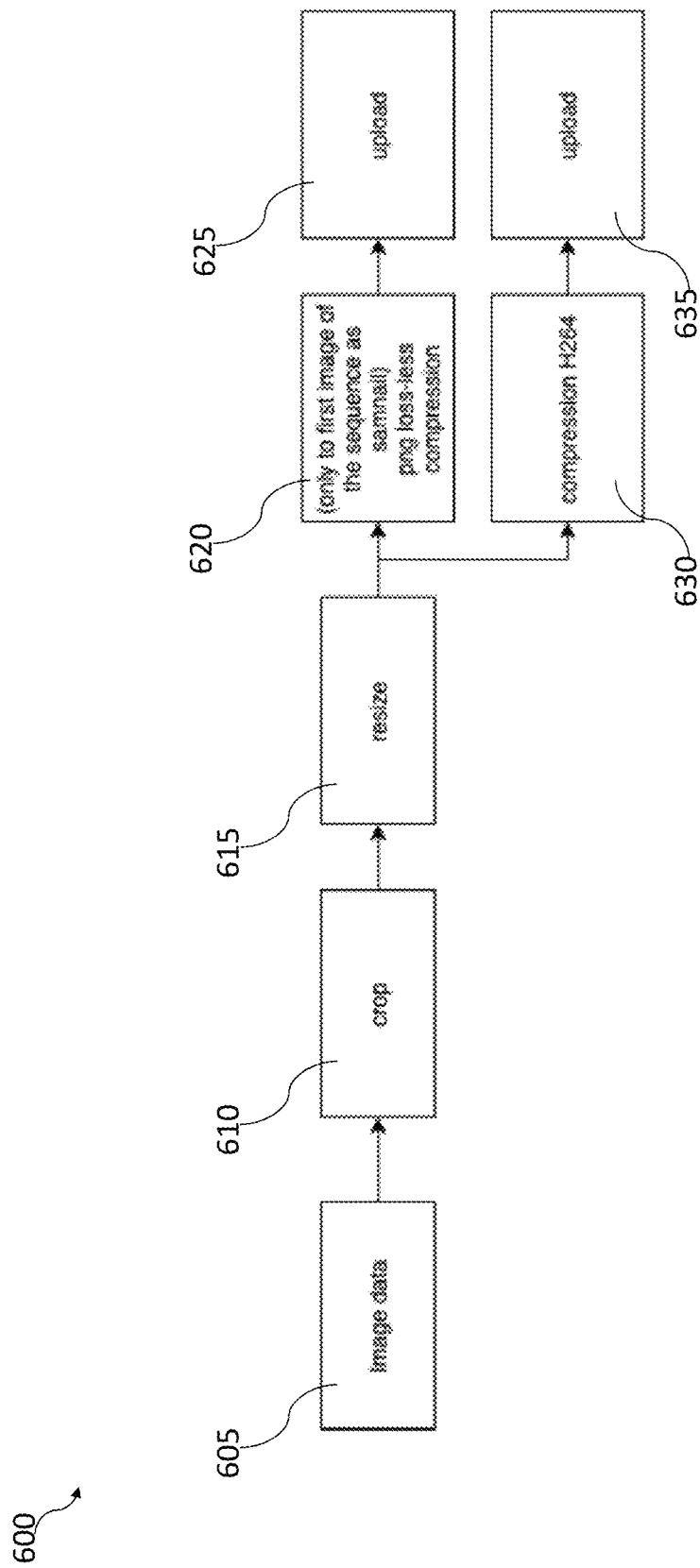
FIG. 6 is a flowchart of a method of processing data to generate customized data in accordance with some embodiments.

In some embodiments, the instruction data in the data collection command has a data structure such as a tree structure. The tree structure comprises a root node which is corresponding to the collected data to be processed, such as image data from camera, leaf nodes which are corresponding to the output data to be transferred to the an external device, such as server 120 (FIG. 1) or UI 110 (FIG. 1), and internal nodes which are other than the root node and the leaf nodes and are corresponding to units of processing of the data. In some embodiments, an internal node is corresponding to either of data resize processing, crop processing, video encoding, such as H.264 encoding, image encoding, such as JPEG encoding, data compression, such as ZIP compression, or other suitable operations. Each leaf node and internal node has a single parent node that is corresponding to a node out of root node or internal nodes. Each root node and internal node have at least one child nodes out of internal nodes and leaf nodes. Each node has at least one parent-child relationship with another node. The parent-child relationship means that the unit of processing that is corresponding to the parent node outputs the data to the unit of the processing that is corresponding to the child node. In some embodiments, the instruction data has a structure of a directed graph. By having the tree structure or the graph structure, the user is able to flexibly define the instruction data which is able to branch the parallel processing of data, for example, as shown in FIG. 6, in addition to serial processing of data. In some embodiments, each node comprises a processing unit ID that identifies the type of the processing and parameters for the processing. In some embodiments, the processing unit ID has a text format that represents the name of the processing unit such as "Image compression JPEG", "Image crop", "Image resize", etc. In some embodiments, the processing unit ID has a universal unique identifier (UUID) format that is uniquely assigned to a specific unit of processing. In response to the instruction data, the DCU 236 executes processing of the collected data corresponding to the instruction data. Additional explanation is provided in association with FIG. 6 below.

In some embodiments, the apps are configured to query the DCU 236 to receive information for what type of processing is available by the DCU 236. In some embodiments, the DCU 236 sends a list of the processing unit IDs in response to the query. In some embodiments, the apps are able to automatically update based on identifying keywords in the information received from the DCU 236. For example, key words like "crop," "resize," or "compression" as well as keywords like "png" or "jpeg" would allow the app to identify the operation to be performed and automatically select the desired operations to be performed on the collected data. Creating the apps to have this level of sophistication includes a greater amount of work by a user initially, but would help the user to avoid updating the apps once the apps have already been installed in the vehicle.

In some embodiments, the DCU 236 is configured to receive a query from the apps or the received data request requesting options for a certain type of processing operation available within the DCU 236. For example, the DCU 236 is able to receive a query related to the types of data compressions that the DCU 236 is able to implement. The DCU 236 is configured to respond, for example with a table including compression ID information associated with available compression types. In some embodiments, the apps are able to automatically update based on the keyword identification of the received information from the DCU 236. In some embodiments, the information from the DCU 236 is transmitted to the user and the user is able to update the apps or the data request with a specific operation type based on the options available within the DCU 236.

The DCU 236 processes the data using the instruction data having a tree or directed graph structure. A non-limiting example of the tree structure processing by the DCU 236 is described below in FIG. 6. In the non-limiting example of FIG. 6, image data 605 is corresponding to the root node, units of processing 610, 615, 620 and 630 are corresponding to the internal nodes, and the upload 625 and 635 are corresponding to the leaf nodes. The DCU 236 is able to perform different operations in an order that is corresponding to the tree structure or the directed graph structure to produce data in the format desired by the user. The DCU 236 is able to process data that has already undergone some initial processing. For example, the DCU 236 is able to resize an image that has already undergone a cropping process. The DCU 236 is able to perform multiple operations on a previously processed piece of data. For example, the DCU 236 is able to perform multiple compressions of a cropped image. In some embodiments, the DCU 236 is unable to combine two previously processed pieces of data during a subsequent processing operation. For example, in some embodiments, the DCU 236 is unable to compress a cropped image and a resized image in a single operation. Instead, the DCU 236 is able to separately compress the cropped image and the resized image.

In some embodiments, the instructions for processing the data include information for how the instructions should be implemented. In some embodiments, parameters, such as post-processing parameter 410 (FIG. 4), in the in the data collection command includes parameters that are used for the units of processing. For example, in some embodiments where the instructions indicate resizing of an image, the node corresponding to the unit of resizing processing in the data collection command includes a desired size of the resized image. In some embodiments where the instructions indicate cropping of the image, the node corresponding to the unit of cropping operation in the data collection command includes (x, y) positions of the top-left point and the bottom-right point of a rectangle of the cropping target. One of ordinary skill in the art would recognize that these are mere examples and that this disclosure covers a wide variety of instructions for implementing processing of collected data.

The DCU 236 is also able to instruct a transmitter within the vehicle to transmit the processed data corresponding to each leaf node to an external device, such as UI 110 (FIG.

1) or sever 120 (FIG. 1). In some embodiments, the processed data is transmitted along with corresponding metadata. In some embodiments, the processed data along with corresponding metadata is stored in the memory unit 237 until the processed data and metadata are transmitted. In some embodiments, the processed data and metadata are erased from the memory unit 237 following transmission. In some embodiments, the processed data and metadata are erased from the memory unit 237 following receipt of a confirmation from the external device that the data was received. In some embodiments, the DCU 236 is configured to prioritize transmission of the processed data and metadata based on priority information in the data collection command or determined by the DCU 236 during analysis of the data collection command.

In some instances, processing the data within the vehicle reduces an amount of data that is transmitted from the vehicle, which helps to reduce power consumption of the vehicle as well as reducing data congestion between the vehicle and external device, such as the UI 110 (FIG. 1) or the server 120 (FIG. 1). The reduce power consumption helps to reduce a risk of the vehicle from running out of power. For example, a battery of an electric vehicle (EV) becoming depleted. In some embodiments, the DCU 236 is configured to hold processed data without transmitting the processed data if a state of charge (SOC) of the vehicle is below a first threshold. In some embodiments, the DCU 236 is configured to store collected data without processing the collected data if the SOC of the vehicle is below a second threshold, which is less than the first threshold. In some embodiments, the DCU 236 is configured to store instructions from the apps or a received data request without collecting the corresponding data if the SOC of the vehicle is below a third threshold, which is less than the second threshold. By avoiding power consuming operations during a low SOC, a risk of the vehicle depleting a power supply is reduced.

In some instances, processing the data within the vehicle increases an amount of data transmitted from the vehicle. The increased amount of data results in better information available to the app designer in order to determine whether to, and how, to update the app based on the information received.

Reducing data congestion between the vehicle and external devices also helps to ensure that the vehicle is able to receive information usable for updating or optimizing the apps, OS or other devices within the vehicle. For example, a software update of the apps, such as automated driving system, via OTA update helps the vehicle be driven safely and comfortably for passengers. For example, an update for traffic information helps a car navigation system within the vehicle determine a route for the vehicle to travel. For example, an update for a map helps a car navigation system within the vehicle determine a route for the vehicle to travel. For example, an update for a map helps an automated driving system within the vehicle drive the vehicle safely. Reducing data congestion between the vehicle and external devices helps to ensure that data, such as the software update, the traffic update, the map update, is properly received by the vehicle for use by apps and components within the vehicle.

The system 200 is able to utilize apps as well as data collection commands from users in order to determine whether and what type of data to collect, such as sensor data, application logs, or system logs. The system 200 is able to process the collected data in order to provide the data to the user in a desired format so that the user is able to develop a new app or update an existing app. The system 200 is agnostic to a programming language of the app and to a data structure desired by the user. As a result, the system 200 is able to provide customized data to the user to reduce or avoid the user using specialized equipment or knowledge for determining a meaning of the received data. In some embodiments, the system 200 also reduces extraneous data provided to the user, which saves the user time in developing the new app or updating the existing app. As a result, enhanced apps having greater reliability are more readily available to the operator of the vehicle faster than with other systems.

Figure 3:
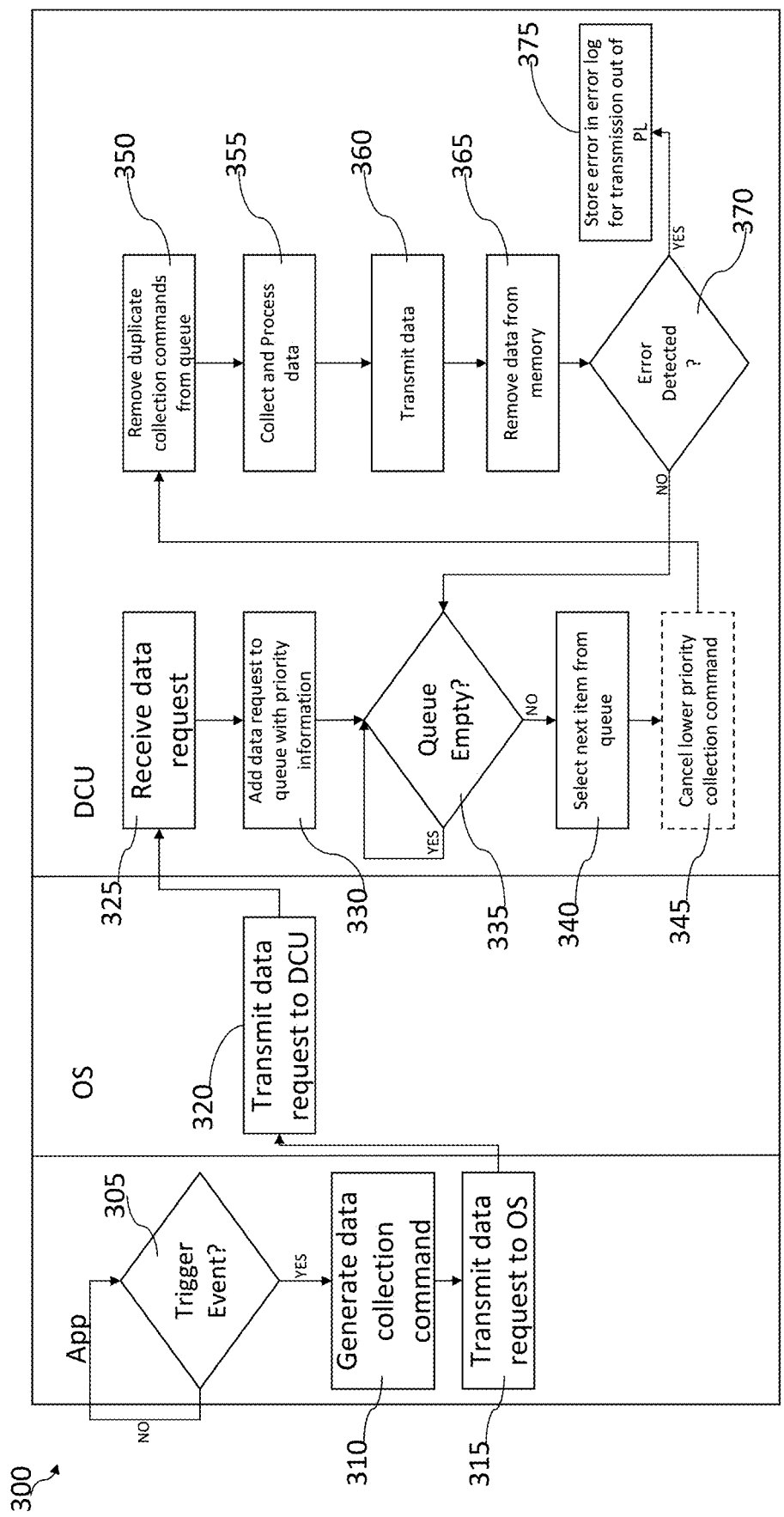
FIG. 3 is a flowchart of a method of collecting customized data in accordance with some embodiments.

FIG. 3 is a flowchart of a method 300 of collecting customized data in accordance with some embodiments. In some embodiments, the method 300 is implemented using system 100 (FIG. 1) or system 200 (FIG. 2). The method 300 includes reference to devices, such as app, OS and DCU. One of ordinary skill in the art would recognize that these devices are merely exemplary in order to assist in understanding this disclosure and are not intended to limit the scope of this disclosure. Further, one of ordinary skill in the art would understand that method 300 is able to be modified to receive data requests from external devices, such as the UI 110 (FIG. 1) or the server 120 (FIG. 2), for processing by the DCU, for example.

The method 300 includes operation 305 in which an app determines whether a trigger event has occurred. In some embodiments, the trigger event includes "crashing" of the app, a detected abnormality in the app, or another suitable detected occurrence. In some embodiments, the trigger event includes an occurrence within the vehicle or in an environment surrounding the vehicle. In some embodiments, the trigger event is based on receipt of a request from the user. In response to detection of a trigger event, the method 300 proceeds to operation 310. In response to failure to detect a trigger event, the method 300 returns to operation 305 and awaits detection of a trigger event.

The method 300 further includes operation 310 in which a data collection command is generated by the app. The data collection command is generated based on instructions within the app. The data collection command includes a type of data to collect, a duration of the data to collect, frequency of the data to collect, a source of the data to be collected, identifying information for the app generating the data collection command, and processing instructions for how to process the collected data. In some embodiments, the type of data includes at least one of sensor data, application log data or system log data. In some embodiments, the data collection command further includes priority level information for the data collection command. In some embodiments, the priority level is set based on an identity of the user. In some embodiments, the priority level is set based on a functionality of the app. In some embodiments, the DCU overrides the priority level in the data collection command.

The method 300 further includes operation 315 in which the app transmits the data collection command to the OS. In some embodiments, a programming language or data structure of the app is different from a programming language or data structure of the DCU. The OS, using an API, is able to facilitate communication of the data collection command from the app to be usable by the DCU for implementing the instructions in the data collection command.

The method 300 further includes operation 320 in which the OS transmits the data request to the DCU. Using the OS to transmit the data request to the DCU helps to make the method 300 agnostic to the data structure and programming language of the app. This increases the flexibility of the method 300 to be implemented across numerous systems and using apps developed by a wider range of users.

The method 300 further includes operation 325 in which the DCU receives the data collection command. The DCU receives the data collection command from the OS in the method 300. In some embodiments, the DCU receives the data collection command directly from the app. In some embodiments, the DCU receives the data collection command from an external device, such as UI 110 (FIG. 1).

The method 300 further includes operation 330 in which the data collection command is added to a queue for processing by the DCU based on priority information. The queue determines an order in which data satisfying the data collection commands is collected and processed by the DCU. By including priority levels, the DCU is able to fulfill data requests in a preferential manner so that higher value data collection commands are addressed more quickly than lower value data collection commands. This helps to maintain performance of the vehicle in an optimal state. In some embodiments, a priority level of a data collection command increases as a time since the DCU received the data collection command increases. In some embodiments where the data collection command does not include priority information, the data collection command is added to the queue based on a time stamp of when the DCU receives the data request. In some embodiments where the data collection command does not include priority information, the data collection command is added to the queue based on an identity of the user or identification information of the app that generated the data collection command.

The method 300 further includes operation 335 in which the DCU determines whether the queue is empty. In response to a determination that the queue is empty, the method 300 returns to operation 335 and waits to receive a new data request. In response to a determination that the queue is not empty, the method 300 proceeds to operation 340.

The method 300 further includes operation 340 in which the DCU selects a next item from the queue. The next item is a data collection command having a highest priority level in the queue.

The method 300 further includes optional operation 345 in which a lower priority data collection command is removed from the queue. Lower priority data collection commands are removed from the queue in response to an available capacity of the queue falling below a threshold capacity value and a priority level of a data request being below a priority threshold value. Removing low priority data collection commands from the queue when the queue is close to capacity helps to ensure that high priority data collection commands are able to be added to the queue. In some embodiments, the operation 345 is omitted. For example, in some embodiments where the DCU is determined to have sufficient memory capacity for the queue, the operation 345 does not significantly improve performance of the method and the operation 345 is omitted.

The method 300 further includes operation 350 in which duplicate data collection commands are removed from the queue. In some embodiments, when a data collection command requests data that was already requested by a previous data collection command, the later received data collection command is removed from the queue in the operation 350. In some embodiments, when a data collection command is requesting collecting data that overlaps with a previous data collection command, the overlapping portion of the later received data collection command is removed from the queue by the operation 350. For example, in some embodiments, a first data collection command requests data of a sensor at times t=100, 102, 104, 106, and a subsequent data collection command is requests data from the same sensor at times t=102, 103, 104, 105, 106, 107, 108, then the part of the information of the for the subsequent data collection command that is repetitive of the first data collection command is removed so that the modified subsequent data collection command is only requesting collecting data of the sensor at times t=103, 105, 106, 107, 108. The DCU reviews the data requests in the queue and determines whether any of the data requests are from the same app or user and have the same instructions for data collection and processing. In some embodiments, a same app sends multiple data collection commands for different information to the DCU, so removal of data collection commands based purely on an identity of the app or the user increases a risk that a data collection command is not properly processed. Removal of duplicate data collection commands from the queue helps to reduce needless processing and transmission by the DCU. This reduces power consumption and data congestion of the vehicle including the DCU.

The method 300 further includes operation 355 in which the DCU collects and processes the data. The DCU collects data from a buffer area, one or more sensors, an app, or a memory based on a type of data requested by the data request from the app or the user. In some embodiments where the DCU removed a portion of the data collection command, only data related to the remaining portion of the data collection command is collected. In some instances, the processing between two overlapping data collection commands is different. In some embodiments where overlapping data collection commands have different processing instructions, all of the data is processed according to each of the data collection commands. By omitting portions of the data collection command that overlap a previous data collection command, the DCU reduces processing load and energy consumption. By still processing the entire data set for the data collection command, the user is still provided with all of the desired data. The DCU then processes the collected data based on the instructions in the data collection command. Details of the processing of the data are provided above in accordance with some embodiments. Further, non-limiting examples of processing of data is described in detail below in FIGS. 5A, 5B and 6.

The method 300 further includes operation 360 in which the processed data is transmitted to the user, the app or an external device. In some embodiments, the processed data is transmitted to the user, e.g., by the UI 110 (FIG. 1). In some embodiments, a notification is transmitted with the processed data. In some embodiments, the notification includes an audio or visual alert. In some embodiments, the notification causes a mobile device controllable by the user to automatically display the notification. In some embodiments, the processed data is transmitted to the app for storage and a notification is transmitted to the user to access the processed data from the app. In some embodiments, the processed data is transmitted to an external device, such as server 120 (FIG. 1), for storage. In some embodiments, the processed date is transmitted to the external device and a notification is transmitted to the user, e.g., by the UI 110 (FIG. 1), to access the processed data from the external device.

The method 300 further includes operation 365 in which the DCU removes the data from the memory. In some embodiments, removal of the data includes removal of the processed data as well as raw collected data and metadata associated with the processed data. In some embodiments, removal of the data includes identification of a section of the memory storing the data and making this section of the memory available to be overwritten by new data. Removal of the data helps to avoid a situation in which the memory reaches a capacity where an ability of the DCU to receive and process new data requests is reduced or prohibited.

The method 300 further includes operation 370 in which a determination is made regarding whether an error was detected during collection, processing or transmitting of the data. In some embodiments, an error is detected in response to a portion of data stored in the memory becomes unreadable or a write operation to a portion of the memory fails. In some embodiments, an error is detected in response to the DCU failing to properly interface with the app or an external device. In some embodiments, the error is a network error, such as HTTP error, Cyclic Redundancy Check (CRC) error of a data packet, etc., indicating a failure of the DCU to effectively transmit or received data. For example, in some embodiments, a network error is detected in response to a loss of connectivity between the vehicle and an external device, such as the server 120 or the UI 110 (FIG. 1), during operation 360. In response to a determination that an error occurred, the method 300 proceeds to operation 375. In response to a determination that no error occurred, the method 300 returns to operation 335 to determine whether the queue is empty. In some embodiments, when an error is not detected, the data collection command that was successfully completed without an error is removed from the queue, and, when an error is detected, the data collection command that was not successfully completed but was terminated with an error is not removed from the queue but is kept in the queue so that the data collection command which is not completed yet is processed again. In some embodiments, an error is detected in response to a data request being received by the DCU but not processed. This type of error indicates that the DCU is not running or has crashed, in some instances. In some embodiments, an error is detected in response to a data request being incorrectly identified by the DCU. This type of error indicates that an API between the app and the OS is a different version from an API between the DCU and the OS, in some instances. In some embodiments, an error is detected in response containing invalid instructions. This type of error indicates a problem with the app or the data received from the user, in some instances. In some embodiments, an error is detected in response to the tree or graph structure of the processing instructions include invalid commands. This type of error indicates a problem with the app or the data received from the user, in some instances.

The method 300 further includes operation 375 in which the error is stored in an error log for transmission out of the DCU. In some embodiments, the error log is accessible by an external device or user. In some embodiments, the error log is transmitted to an external device or user after each error is detected. In some embodiments, the error log is transmitted to an external device or user in batches once a predetermined number of new error are entered into the error log. Generating and reporting an error log helps to determine whether the memory of the DCU is degrading to a point where further processing of data collection commands is inhibited.

In some embodiments, the method 300 includes additional operations. For example, in some embodiments, the method 300 includes the DCU reviewing priority information in the data collection command and determining where in the queue to place a newly received data collection command. In some embodiments, the method 300 includes operations in different order. For example, in some embodiments, operation 350 is performed prior to operation 345. In some embodiments, at least one operation of the method 300 is omitted. For example, in some embodiments, the operation 345 is omitted. In some embodiments, operations 305-320 are omitted when the method 300 is used to process a data collection command received from an external device.

FIG. 4 is a diagram of a data collection command 400 in accordance with some embodiments. In some embodiments, the data collection command 400 is usable in system 100 (FIG. 1), system 200 (FIG. 2), and/or method 300 (FIG. 3). In some embodiments, the data collection command 400 is generated by an app, such as the application 216, the application 226 or the application 232 (FIG. 2). In some embodiments, the data collection command 400 is generated by a user using a UI, such as UI 110 (FIG. 1). One of ordinary skill in the art would recognize that the data collection command 400 is merely an example data collection command and that data collection commands having different parameters are within the scope of this disclosure.

The data collection command 400 includes an event time parameter 401. The event time parameter 401 indicates a time at which a trigger event was detected. The data collection command 400 further includes a time range parameter 402, which includes a start time relevant to the event parameter 403 and an end time relative to the event parameter 404. The time range parameter 402 indicates a duration over which data should be collected relative to detection of the trigger event. The start time relative to the event parameter 403 indicates a time period prior to the detection of the trigger event for which data should be collected. The end time relative to the event parameter 404 indicates a time period after detection of the trigger event for which data should be collected. In some embodiments, the time range parameter 402 further includes a frequency parameter 408 indicating how frequently data is collected between the start time relative to the event parameter 403 and the end time relative to the event parameter 404. The data collection command 400 includes a data source ID parameter 405. The data source ID parameter 405 indicates which sensors or applications should be used to collect the data for satisfying the data collection command 400. In some embodiments, the data source ID parameter 405 includes an array of sensors and/or applications. In some embodiments, the data source ID parameter 405 includes only one or more sensors. In some embodiments, the data source ID parameter 405 includes only one or more applications. In some embodiments, the data source ID parameter 405 includes at least one sensor and at least one application. In some embodiments, the data source ID parameter 405 includes OS. The data collection command 400 further includes a priority parameter 406. The priority parameter 406 indicates a priority level requested by the data collection command 400. As discussed above, in some embodiments, a DCU, such as DCU 236 (FIG. 2), overrides the priority parameter 406. The data collection command 400 further includes a requester ID parameter 407. The requester ID parameter 407 indicates a source of the data collection command 400. In some embodiments, the requester ID parameter 407 indicates an application which generated the data collection command 400. In some embodiments, the requester ID parameter 407 indicates an identity of a user that generated the data collection command 400. The data collection command 400 further includes a post-processing parameter 410. The post-processing parameter 410 indicates what processing should be performed on the collected data prior to the data being made available to the user. In some embodiments, the post-processing parameter 410 defines a tree structure for implementing the processing of the collected data.

FIG. 5A is a view of code 500A represented by an example of interface description language (IDL) for a data collection command in accordance with some embodiments. The code 500A is agnostic to a system, such as system 100 (FIG. 1) or system 200 (FIG. 2), used to implement generation of the data collection command as well as collecting and processing data based on the data collection command. In some embodiments, the code 500A is written in JavaScript Open Notation (JSON). In some embodiments, the code 500A is written in a different programming language. The code 500A includes a priority level information 510A. The code 500A further includes time range information 520A. The code 500A further includes post-processing information 530A that represents a tree structure of the processing instructions. This tree structure is a non-limiting example of post-processing parameter 410 (FIG. 4). The code 500A further includes log level information 540A. The log level information 540A indicates what type of information the data collection command should retrieve from other applications in order to satisfy the data collection command. One of ordinary skill in the art would understand that the code 500A is merely exemplary and that additional information and other types of data structures for the data collection command are within the scope of this disclosure.

Figure 5B:
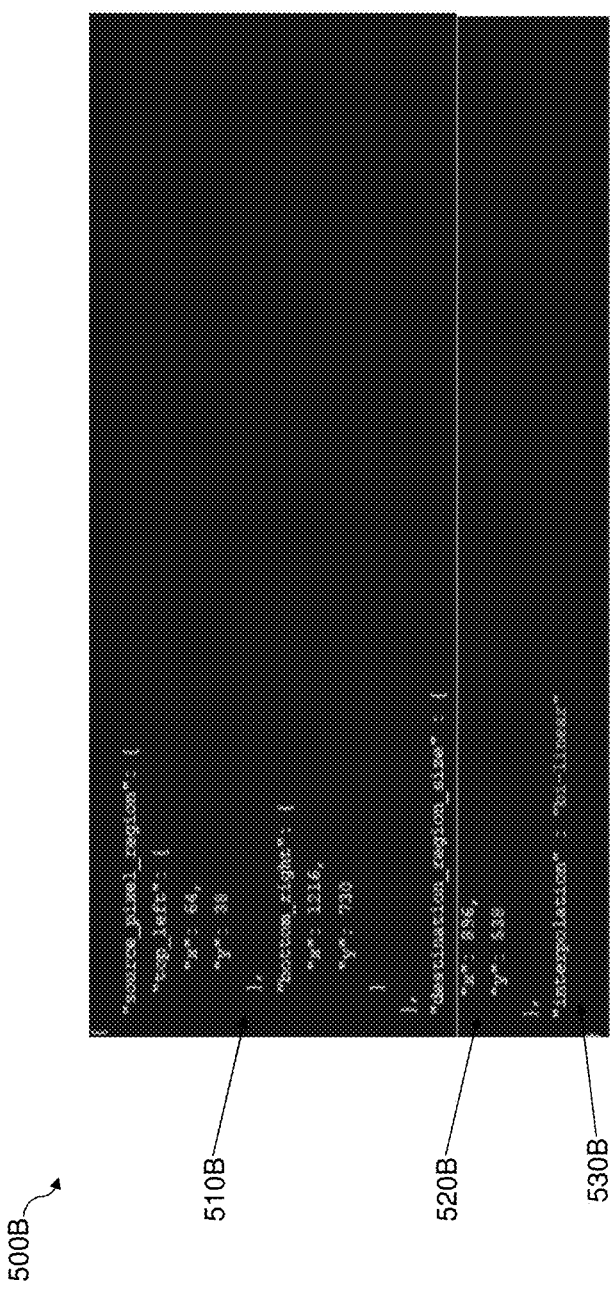
FIG. 5B is a view of code for image cropping in accordance with some embodiments.

FIG. 5B is a view of code 500B for image cropping in accordance with some embodiments. The code 500B represents parameters that is included in a node of an unit of crop processing The code 500B is agnostic to a system, such as system 100 (FIG. 1) or system 200 (FIG. 2), used to implement generation of a data collection command as well as collecting and processing data based on the data collection command. In some embodiments, the code 500B is written in JSON. In some embodiments, the code is written in a different programming language. In some embodiments, the code 500B is usable as part of a data collection command, such as for post-processing information 530A (FIG. 5A).

The code 500B includes cropping corner information 510B. The cropping corner information 510B indicates a location at a top-left corner and a bottom-right corner boundaries of the cropped image. The code 500B further includes image re-sizing information 520B that indicates a size of the cropped image in the x-direction and the y-direction following re-sizing of the cropped image. The code 500B further indicates interpolation information 530B that indicates an algorithm used for interpolation during the re-sizing of the image. One of ordinary skill in the art would understand that the code 500B is merely exemplary and that additional information and other types of data structures for image cropping are within the scope of this disclosure. One of ordinary skill in the art would understand that the code 500A is merely exemplary and that additional information and other types of data structures for the data collection command are within the scope of this disclosure. Further, one of ordinary skill in the art would understand that image cropping is merely exemplary and that additional types of processing are within the scope of this disclosure.

FIG. 6 is a flowchart of a method 600 of processing data to generate customized data in accordance with some embodiments. In some embodiments, the method 600 is implemented using system 100 (FIG. 1) or system 200 (FIG. 2). In some embodiments, the method 600 is performed as part of operation 355 of method 300 (FIG. 3). The method 600 has a tree structure. In method 600, each child node of the tree structure refers to a single parent node. A parent node is able to be referred to by multiple child nodes in the method 600.

The method 600 includes operation 605 in which image data is received. The image data is known as a root node in a tree structure. The image data is collected in response to a detected trigger event. In some embodiments, the image data is collected from one or more cameras attached to a vehicle. In some embodiments, the image data is received by retrieving the image data from a buffer area, such as buffer area 238 (FIG. 2). In some embodiments, the image data includes a single image. In some embodiments, the image data includes a plurality of images captured over a time range defined based on instructions in a data collection command received from an app or a user.

The method 600 further includes operation 610 in which the image data is cropped. Cropping the image selects portions of the image data for subsequent processing in the tree structure of method 600. The non-selected portions of the image are removed and excluded from further processing. In some embodiments, the image data is cropped based on instructions in a data collection command from an app or a user. In some embodiments, the image is cropped to remove portions of the image data predetermined by the instructions in the data collection command.

The method 600 further includes operation 615 in which the cropped image data is resized. The resizing is performed on the cropped image generated in operation 610, not on the original image data received in operation 605. In some embodiments, the image data is resized based on instructions in the data collection command. In some embodiments, the image data is resized to have a defined number of pixels based on the instructions in the data collection command. In some embodiments, the image data is resized based on adjusting a size of the image data by a defined factor, e.g., 1.5 or 0.75, based on the instructions in the data collection command. In some embodiments, the instructions in the data request further include an algorithm to be used during the resizing of the image data.

The method 600 further includes operation 620 in which a resized first image of the image data is compressed using a png loss-less algorithm. The compression is performed on the resized image generated in operation 615, not the cropped image generated in operation 610 or the raw image data received in operation 605. The compression is performed using an algorithm defined by the instructions in the data collection command. The compression is also performed on only the first image based on the instructions in the data collection command.

The method 600 further includes operation 625 in which the compressed first image is uploaded. The operation 620 produces a compressed image which is known as a leaf node in a tree structure. The compressed first image is uploaded to a queue for transmission to the user or an external device, such as UI 110 (FIG. 1) or server 120 (FIG. 1). In some embodiments, the compressed first image is uploaded to a memory accessible by the user and a notification, such as an audio or visual alert, is transmitted to the user for accessing the memory.

The method 600 further includes operation 630 in which the resized image data is compressed using an H264 algorithm. The compression is performed on the resized image generated in operation 615, not the cropped image generated in operation 610 or the raw image data received in operation 605. The method 600 compresses a portion of the resized image data in using two different algorithms, i.e., png loss-less in operation 620 and H264 in operation 630. The compression is performed using an algorithm defined by the instructions in the data collection command. The compression is also performed on all of the image data based on the instructions in the data collection command.

The method 600 further includes operation 635 in which the compressed image data from operation 630 is uploaded. The operation 630 produces a compressed image which is known as a leaf node in a tree structure. The compressed image data is uploaded to a queue for transmission to the user or an external device, such as UI 110 (FIG. 1) or server 120 (FIG. 1). In some embodiments, the compressed image data is uploaded to a memory accessible by the user and a notification, such as an audio or visual alert, is transmitted to the user for accessing the memory. In some embodiments, operations 625 and 635 are performed in combination and a notification is not transmitted to the user until both operations 625 and 635 are completed. In some embodiments, a notification is transmitted to the user upon completion of either of operation 625 or operation 635. While operation 625 and operation 635 include similar steps, each of operation 625 and operation 635 have a single parent node. That is, operation 625 has the parent node of operation 620; and operation 635 has the parent node of operation 630. Operations 625 and 635 do not share a common parent node. In some embodiments, the operation 620 and the operation 630 are processed in parallel by utilizing many cores of the processor 702. In some embodiments, the operation 625 and 635 are processed in parallel.

In some embodiments, the method 600 includes additional operations. For example, in some embodiments, multiple cropping operations are performed on the received image data. In some embodiments, at least one operation of the method 600 is omitted. For example, in some embodiments, operation 615 is omitted and operations 620 and 630 are performed using operation 610 as the parent node. In some embodiments, an order of operations in the method 600 is changed. For example, in some embodiments, operations 625 and 635 are performed simultaneously.

FIG. 7 is a diagram of a system 700 for implementing collecting of customized data in accordance with some embodiments. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices, such as UI 110 (FIG. 1) or server 120 (FIG. 1). The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 504 in order to cause system 700 to be usable for performing a portion or all of the operations as described in system 100 (FIG. 1), system 200 (FIG. 2), method 300 (FIG. 3) or method 600 (FIG. 6).

In some embodiments, the processor 702 is a central processing unit (CPU), a graphics processing unit (GPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform portion or all of the operations as described in system 100 (FIG. 1), system 200 (FIG. 2), method 300 (FIG. 3) or method 600 (FIG. 6). In some embodiments, the storage medium 704 also stores information needed for performing portion or all of the operations as described in system 100 (FIG. 1), system 200 (FIG. 2), method 300 (FIG. 3) or method 600 (FIG. 6) as well as information generated during performing portion or all of the operations as described in system 100 (FIG. 1), system 200 (FIG. 2), method 300 (FIG. 3) or method 600 (FIG. 6), such as a trigger event parameter 706, a tree node parameter 718, a data processing parameter 720, a time range parameter 722, and/or a set of executable instructions to perform portion or all of the operations as described in system 100 (FIG. 1), system 200 (FIG. 2), method 300 (FIG. 3) or method 600 (FIG. 6).

In some embodiments, the storage medium 704 stores instructions 707 for interfacing with manufacturing machines. The instructions 707 enable processor 702 to generate manufacturing instructions readable by the external devices to effectively implement portion or all of the operations as described in system 100 (FIG. 1), system 200 (FIG. 2), method 300 (FIG. 3) or method 600 (FIG. 6).

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, all of the operations as described in system 100 (FIG. 1), system 200 (FIG. 2), method 300 (FIG. 3) or method 600 (FIG. 6) implemented in two or more systems 700, and information such as trigger event, tree nodes, data processing, and time range are exchanged between different systems 700 via network 714.

An aspect of this description relates to a vehicle. The vehicle includes a sensor. The vehicle further includes a transmitter. The vehicle further includes a non-transitory computer readable medium configured to store instructions thereon. The vehicle further includes a processor connected to the non-transitory computer readable medium. The processor is configured to execute the instructions for receiving or generating a data collection command, wherein the data collection command includes processing instructions for processing collected data, the processing information includes a number of processing operations to be performed, and a type of processing for each of the processing operations. The processor is further configured to execute the instructions for collecting data from at least one of a sensor, an application log, or a system log based on the data collection command. The processor is further configured to execute the instructions for processing the collected data based on the processing instructions. The processor is further configured to execute the instructions for instructing the transmitter to transmit the processed data. In some embodiments, the vehicle further includes a plurality of sensors, wherein the sensor is one of the plurality of sensor, and the processor is configured to execute the instructions for identifying the sensor from the plurality of sensors based on the received data collection command. In some embodiments, the non-transitory computer readable medium further includes an application stored thereon and executed by the processor, the processor is configured to generate the data collection command in response to detection of an occurrence of a trigger event. In some embodiments, the non-transitory computer readable medium is configured to store criteria for determining the trigger event. In some embodiments, the data request includes instructions for a time range of information to be collected. In some embodiments, the data collection command includes priority level information. In some embodiments, the processor is configured to execute the instructions for processing the collected data based on a tree structure defined by the data collection command. In some embodiments, the data request includes information related to an algorithm for performing at least one of the processing operations. In some embodiments, the processor is further configured to execute the instructions for: receiving or generating a second data collection command; determining whether data to be collected based on the second data collection command overlaps with data to be collected based on the data collection command; removing data collection instructions for overlapping data from the second data collection command; and processing an entirety of the second data collection command.

An aspect of this description relates to a method. The method includes receiving a data collection command, wherein the data request includes processing instructions for processing collected data collected, the processing information includes a number of processing operations to be performed, and a type of processing for each of the processing operations. The method further includes collecting data from at least one of a sensor connected to a vehicle, an application log, or a system log based on the data collection command. The method further includes processing the collected data based on the processing instructions. The method further includes instructing a transmitter to transmit the processed data. In some embodiments, the method further includes selecting the sensor from a plurality of sensors attached to the vehicle based on the data request. In some embodiments, the method further includes executing an application, wherein executing the application includes generating the data collection command in response to detection of an occurrence of a trigger event. In some embodiments, the trigger event includes crashing of the application to detecting an abnormality of the application. In some embodiments, the method further includes generating the data collection command including instructions for a time range of information to be collected. In some embodiments, the method further includes generating the data collection command including priority level information. In some embodiments, processing the collected data includes processing the collected data based on a tree structure defined by the data request. In some embodiments, the method further includes generating the data request including information related to an algorithm for performing at least one of the processing operations. In some embodiments, the method further includes receiving or generating a second data collection command; determining whether data to be collected based on the second data collection command overlaps with data to be collected based on the data collection command; removing data collection instructions for overlapping data from the second data collection command; and processing an entirety of the second data collection command.

An aspect of this description relates to a system. The system includes a non-transitory computer readable medium configured to store instructions thereon. The system further includes a processor connected to the non-transitory computer readable medium. The processor is configured to execute the instructions for receiving data collection instructions based on instructions from a user, wherein the data collection instructions include a trigger event, a type of data to be collected and a time range over which the data is to be collected. The processor is further configured to execute the instructions for receiving processing instructions from the user, wherein the processing instructions comprise a tree structure of processing operations to be performed on collected data, and a type of processing for each node of the tree structure. The processor is further configured to execute the instructions for generating a data collection command based on the received data collection instructions and the received post-processing instructions. The processor is further configured to execute the instructions for instructing, in response to detection of the trigger event, transmission of the data collection command to a data collection unit of a vehicle, wherein the vehicle has a sensor. In some embodiments, the processor is further configured to execute the instructions for instructing transmission of an application log in conjunction with transmission of the data collection command.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
   a non-transitory computer readable medium configured to store instructions thereon; and
   a processor connected to the non-transitory computer readable medium, wherein the processor is configured to execute the instructions for:
   receiving data collection instructions based on an input from a user, wherein the data collection instructions include a trigger event, a type of data to be collected and a time range over which the data is to be collected;
   receiving processing instructions from the user, wherein the processing instructions comprise a tree structure of processing operations to be performed on collected data, and a type of processing for each node of the tree structure;
   generating a data collection command based on the received data collection instructions and the received processing instructions; and instructing, in response to detection of the trigger event, transmission of the data collection command to a data collection unit of a vehicle, wherein the vehicle includes a sensor.

2. The system according to claim 1, wherein the processor is further configured to execute the instructions for:

instructing transmission of an application log in conjunction with transmission of the data collection command.

\* \* \* \* \*